United States Patent [19]

Guggenheim

[11] Patent Number: 4,576,201

[45] Date of Patent: Mar. 18, 1986

[54] MULTI-PORT VALVE ASSEMBLY

[75] Inventor: S. Frederic Guggenheim, Teaneck, N.J.

[73] Assignee: The United States of America as represented by the United States Department of Energy, Washington, D.C.

[21] Appl. No.: 672,229

[22] Filed: Nov. 16, 1984

[51] Int. Cl.[4] ............................................. F15B 21/02
[52] U.S. Cl. ................................ 137/624.18; 251/901
[58] Field of Search ...................... 137/624.11, 624.18, 137/624.2; 251/327, 328, DIG. 2

[56] References Cited

U.S. PATENT DOCUMENTS

| | | | |
|---|---|---|---|
| 3,166,291 | 1/1965 | Grove | 251/328 X |
| 3,177,989 | 4/1965 | Scott | 137/624.11 |
| 3,198,084 | 8/1965 | Hague | 137/624.18 X |
| 3,602,096 | 8/1971 | Toth | 137/624.18 X |
| 3,936,031 | 2/1976 | Berman | 251/327 X |

Primary Examiner—Alan Cohan

Attorney, Agent, or Firm—Paul A. Gottlieb; John M. Albrecht; Judson R. Hightower

[57] ABSTRACT

A multi-port fluid valve apparatus is used to control the flow of fluids through a plurality of valves and includes a web, which preferably is a stainless steel endless belt. The belt has an aperture therethrough and is progressed, under motor drive and control, so that its aperture is moved from one valve mechanism to another. Each of the valve mechanisms comprises a pair of valve blocks which are held in fluid-tight relationship against the belt. Each valve block consists of a block having a bore through which the fluid flows, a first seal surrounding the bore and a second seal surrounding the first seal, with the distance between the first and second seals being greater than the size of the belt aperture. In order to open a valve, the motor progresses the belt aperture to where it is aligned with the two bores of a pair of valve blocks, such alignment permitting a flow of the fluid through the valve. The valve is closed by movement of the belt aperture and its replacement, within the pair of valve blocks, by a solid portion of the belt.

8 Claims, 9 Drawing Figures

MULTI-PORT VALVE ASSEMBLY

CONTRACTUAL ORIGIN OF THE INVENTION

The United States government has rights in this invention pursuant to employment of the Applicant by the U.S. Department of Energy.

BACKGROUND OF THE INVENTION

The present invention relates to fluid valves and more particularly to a multi-port valve assembly.

At the present time it is known that the flow of fluids, such as gases and liquids, may be controlled by various types of valves. In certain situations, it may be necessary to have a number of valves in one location, with each valve controlling a different fluid path. It may also be desirable that the valve control be automatic, as distinct from an individual manual control; or that the valves operate in a certain timed sequence or be controlled from a remote location.

One solution for such an assembly of valves, called a "multi-port valve apparatus", is to gather a number of individual valves as part of one physical assembly, for example, by securing them closely together on a common manifold. Each of the valves is individually controlled, by its own electrical switch, and the valves are solenoid operated. The closure of the switch will either open or close the valve, depending upon the spring and solenoid arrangement. Such a multi-port valve apparatus, using a solenoid valve, if constructed of high quality valves which are tight against even the smallest leakage, i.e., "bubble-tight", are quite expensive. Further, since each valve has its own solenoid, its own electrical line and its own switch, as the number of valves increases, so does the chance of the system developing a mechanical or electrical fault. If the system is subject to an adverse environment, such as corrosive gases or physical shocks, the chances of failure, either of their mechanical portions or of their electrical portions, such as the solenoids, is increased.

One particular function, for which the multi-port valve apparatus of the present invention is particularly adapted, is to sample atmospheric gases at different elevations. The gas samples are collected in container bottles and each bottle has two valves, an inlet valve and an outlet valve. The entire system is placed aboard an airplane and the airplane is flown at different heights. At each selected height, both valves of the bottle are opened, the container bottle is purged and then one valve is closed and that bottle is filled with the ambient air pumped from that height. The second valve of that bottle is closed, so that the gas sample collected at that height is retained within the bottle, and the containers are brought to a laboratory for analysis. It is essential, for accurate analysis, that the samples be extremely clean so that all the materials of the collection system must be free of outgasing. For example, if nine bottles are used, then the system requires eighteen valves, each of which must be air-tight and completely clean.

The use of a solenoid type multi-port valve apparatus, in the function of collecting ambient air at various altitudes, and in other functions, has the following various disadvantages. If the valves are normally closed, i.e., spring-loaded to close, it requires continual power to keep them open, which is a drain on the power source. The size of the valve ports is limited, which limits the flow rate, and it is difficult and expensive to obtain ports larger than $\frac{1}{8}$-inch in diameter. Each solenoid valve has a number of moving parts and a number of electrical connections, which limits their reliability. The solenoid operates against a spring and the spring closes the sealing mechanism. Consequently, to obtain a greater sealing force requires a heavier spring and a stronger solenoid, which seriously limits the sealing force. In one type of solenoid valve, the valve seat has a globe shape, which is difficult to seal against small stray particles. It must be heated to operate in cold environments, such as at high altitudes.

The patent literature shows a series of patents which are directed to multi-port valve assemblies and to single valves which use a belt. In U.S. Pat. No. 4,241,761 entitled "Manifold Valve Assembly", a row of ports are selectively controlled by individual valve stems. Each of the valve stems consists of a flexible nipple which encloses a rod, which is spring-loaded and terminates in an actuating button. U.S. Pat. No. 3,752,223 entitled "Air Conditioning Apparatus For Automotive Vehicles" shows a manifold which is manually slidable in a track. The manifold is hollow and has orifices which connect with ducts, the connection between the orifices and the ducts depending upon its position. U.S. Pat. No. 3,223,019 entitled "Linear Air Diffuser" shows an air distribution system in which a damper plate is slidably engaged on a diffusion wall and controls the air flow through openings. U.S. Pat. No. 4,037,108 entitled "Ion Source With Capability of Changing Between Operation Load" is not a fluid valve but rather is an electronic ionization source. The type of ion source, whether an electronic impact ionization or a chemical ionization, is determined by movement of a belt over ports of a cavity. U.S. Pat. No. 3,726,313 entitled "Reciprocating Valve" shows the principles of a roller-band device applied to a single valve.

OBJECTIVES AND FEATURES OF THE INVENTION

It is an objective of the present invention to provide a multi-port valve apparatus which is relatively inexpensive and small in size for the number of its ports and yet which provides a bubble-tight seal against the leakage of gases.

It is a further objective of the present invention to provide such an apparatus in which the valves may be closed, or one of the valves may be opened, for a prolonged period of time without any use of power, and which uses power only when opening or closing the valve.

It is a further objective of the present invention to provide such an apparatus which is effectively sealed against stray particles so that the seal is maintained bubble-tight even under adverse environmental circumstances and which may be sealed with a relatively tight seal, which is not limited by a spring force.

It is a further objective of the present invention to provide such an apparatus which has relatively few moving parts and few electrical connections so as to increase its reliability and lower its cost.

It is a still further objective of the present invention to provide such an apparatus which has a relatively large port size (aperture size) to permit the free and rapid flow of fluid.

It is a feature of the invention to provide a multi-port fluid valve apparatus including a base and a plurality, for example 9, pairs of valve blocks. Each valve block has a bore to conduct fluid and an orifice at the face of its bore. It also has a first seal concentrically around the orifice and a second seal concentrically around the first seal. Each pair of valve blocks is mounted on the base with their orifices aligned and with the valve blocks facing each other and positioned with a gap between them. A web, preferably a stainless steel belt, is positioned in the gaps and in sealing contact with the first and second seals of each valve block. The belt is slidable within the gaps and has at least one aperture. The apparatus further includes motor means, such as a step motor, to move and progress its aperture from alignment with the orifices of one pair of valve blocks and into alignment with the orifices of a different pair of valve blocks to thereby close one valve and open a second valve.

It is a further feature of the invention that the distance between the first and second sealing means is at least as great as the size of the belt's aperture. Preferably the belt is an endless belt having sprocket holes and the motor means includes a motor and a roller driven by said motor and having sprocket teeth. Preferably each of the seals consists of an "O" ring positioned in a groove in the face of the valve block means and a washer seal also positioned in the groove and urged by the "O" ring against the belt.

BRIEF DESCRIPTION OF THE DRAWINGS

Other objectives of the present invention will be apparatus from the detailed description of the invention taken in conjunction with the accompanying drawings.

In the drawings.

DETAILED DESCRIPTION OF THE INVENTION

Figure 1:
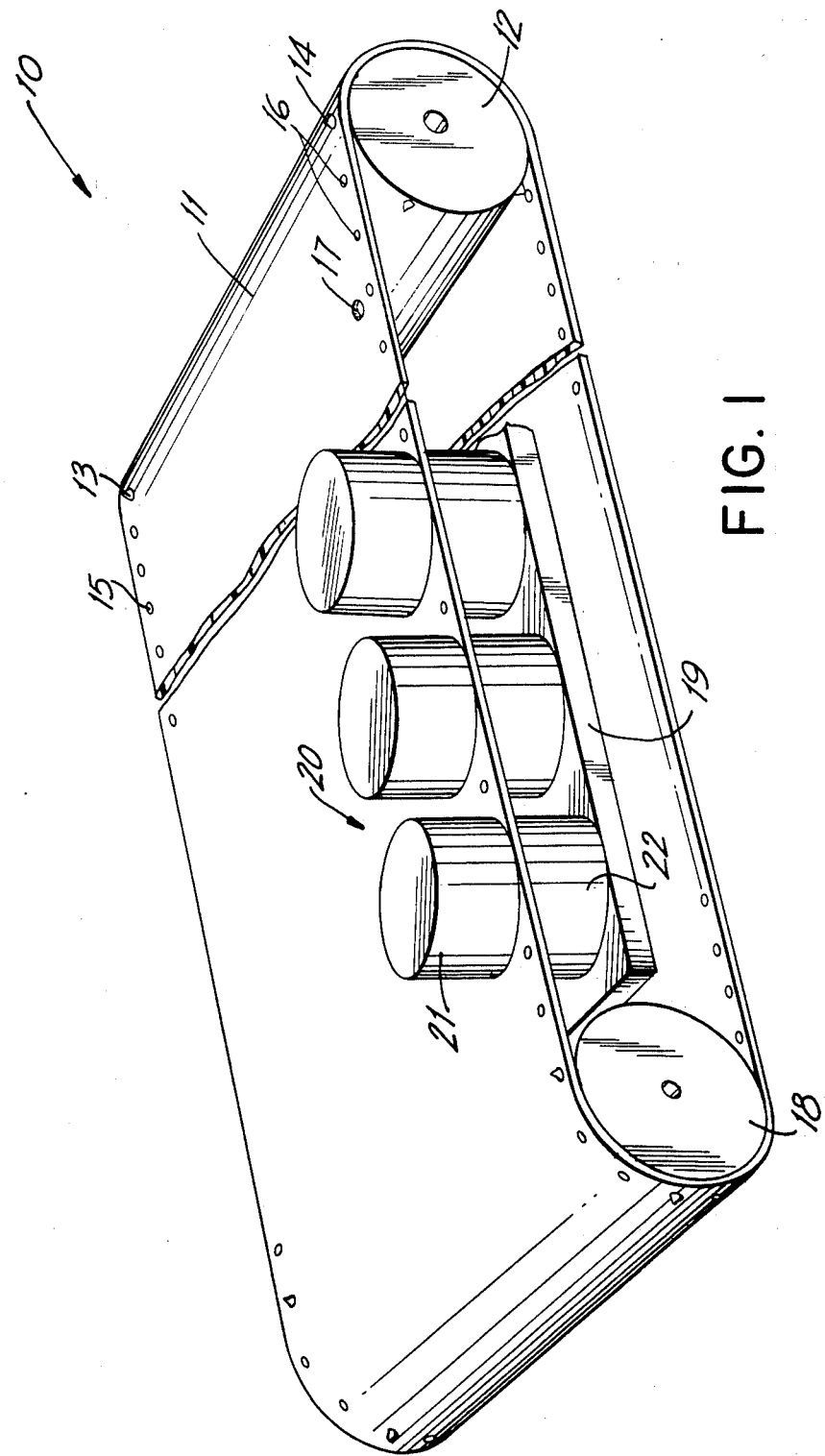
FIG. 1 is a perspective view of the multi-port valve apparatus of the present invention.
Figure 1A:
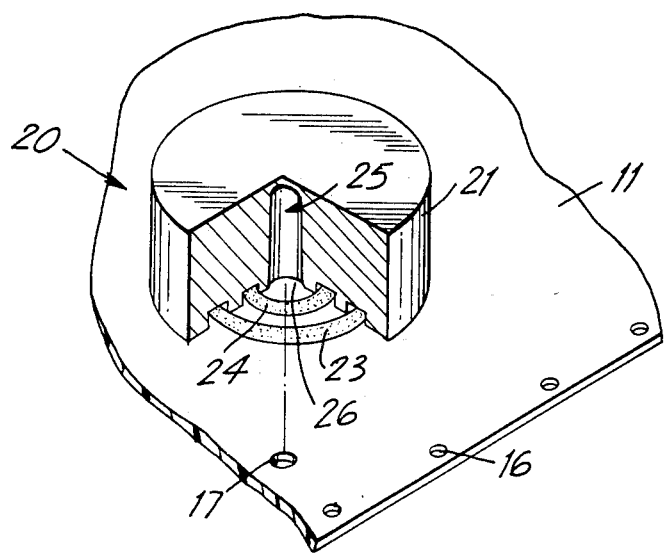
FIG. 1A is an enlarged perspective view showing a valve block.

As shown in FIG. 1, the multi-port valve apparatus 10 utilizes a stainless steel flexible endless belt 11, although other types of webs may alternatively be used. For example, the material of the belt 11 may be a suitable plastic resin instead of stainless steel. As other alternatives, a rotatable disk or a plate, which may be pulled back and forth, may be used instead of the endless belt.

The belt 11 is driven by the sprocket roller 12 which has a first set of protruding sprocket teeth 13 along one side of the roller 12 and a second set of protruding sprocket teeth 14 near to its opposite edge. The belt 11 has a first series of tandem holes 15, which are spaced apart to match the spacing of the sprocket teeth 13, and a second parallel set of tandem sprocket holes 16, which are spaced apart to match the spacing of the sprocket teeth 14. The respective sprocket teeth 13 and 14 fit in the holes 15 and 16 and drive the belt 11, either clockwise or counterclockwise, depending upon the direction of rotation of the sprocket roller 12.

The belt 11 has an aperture 17 which is a hole completely through the belt from its top surface to its bottom surface. The size of the aperture 17 determines the size of the valve opening when its size is equal to, or smaller than, the size of the valve bores. The aperture 17 may be made relatively large, for example, a round hole 3/16 of an inch in diameter. The belt 11 is carried by idler roller 18, which also has sprocket teeth which fit the sprocket holes of the belt. The roller 12 is driven by a motor means (not shown). Preferably the drive is direct so that the output shaft of the motor has a gear which drives a gear fixed to the shaft upon which roller 12 is mounted.

A series of pairs of valve blocks 20 are aligned along the length of the belt 11, for example, there may be nine pairs of valve blocks consisting of eighteen valve blocks. Each pair of valve blocks 20 consists of an upper valve block 21, on one side of belt 11, and a lower valve block 22, on the opposite side of belt 11. Each of the valve blocks is the same and each has two concentric seals 23, 24 on its face in contact with the belt 11 and a central bore 25. Preferably the orifices 26 (the openings) of the bores 25 are of the same size, or larger, than the size of the belt aperture 17.

The valve blocks 20 are bolted to the base 19 (frame) and are adjustable so that the force (pressure) with which their seals contact the belt may be accurately adjusted. Each line of pairs of valve blocks is associated with one belt aperture. For example, if there are two lines of pairs of valve blocks, the belt will have two apertures, to open two valves. Alternatively, and not shown, the belt may have additional apertures so that more than one valve in a line will be opened.

In general, the belt aperture will be operated so that each valve of the line will be operated in sequence, one after the other.

Figure 2:
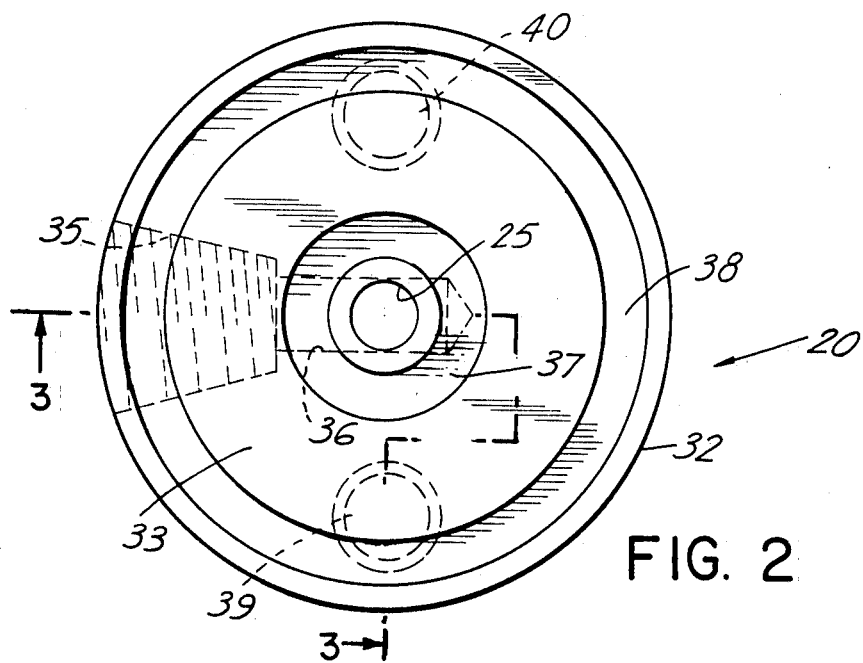
FIG. 2 is a top view of a valve block looking into its bore.
Figure 3:
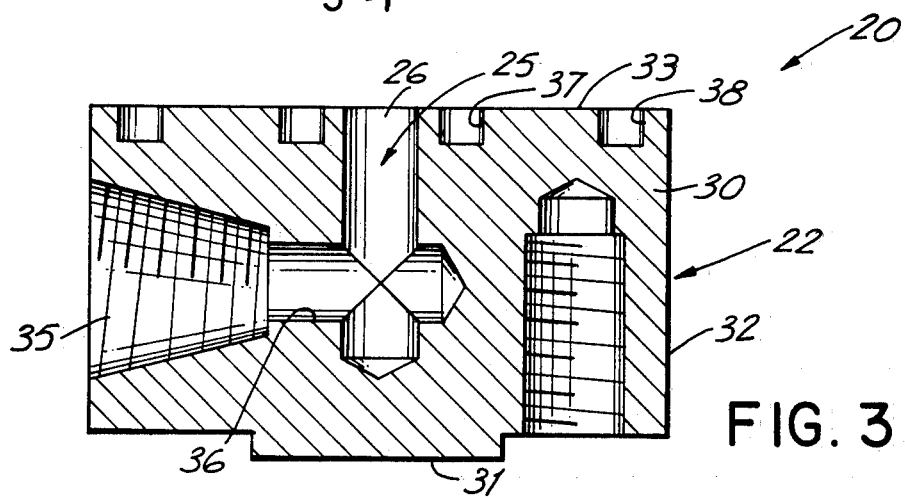
FIG. 3 is a cross-sectional view taken along the line 3—3 of FIG. 2 in the direction of the arrows.

As shown in FIGS. 2 and 3, each of the valve blocks 20, which are all the same, consist of a stainless steel body member 30 having a flat bottom wall 31, a round side wall 32, a top flat wall 33 (face), a central bore 25 and its orifice 26 which are round in cross-section, an input/output nozzle receptacle 35 which is threaded, and an internal bore 36 leading from receptacle 35 to bore 25. The terms "top" and "bottom", above, refer to the valve block as shown in the drawing, and not to the valve block as used in the assembly, as it may be used upside down or sideways. The top wall 33 has an inner groove 37, concentric to bore 25, and an outer groove 38, concentric to the inner groove 37 and to the bore 25. The grooves 37, 38 as seen in FIG. 2, are circular (in plan view) and surround the bore. However, alternatively the grooves may be square or of other shapes, as long as they surround the bore. The valve block 20 has two threaded holes 39, 40 by which it may be bolted to the base.

Figure 4:
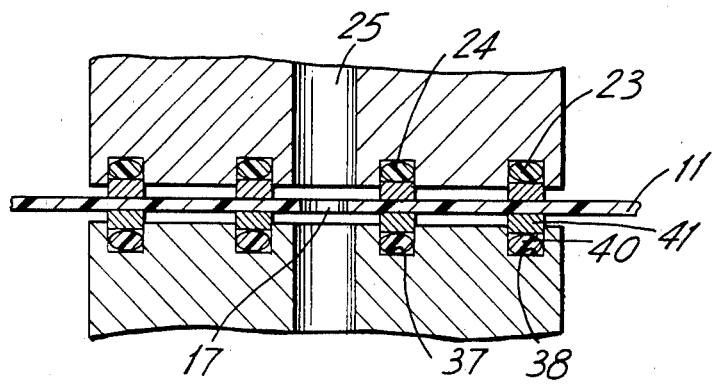
FIG. 4 is a side cross-sectional view, enlarged, of the valve block, which shows the details of the seals.

As shown in FIG. 4, preferably each of the seals in the grooves 37, 38 consists of a bottom "O" ring seal 40 and a top washer seal 41. The "O" ring seal 40 urges the washer seal 41 against the belt and both are seated in the groove. Preferably both seals 40 and 41 are circular in plan view; the "O" ring seal 40 is solid and round in cross-section; and the washer seal 41 is solid and rectangular in cross-section. Preferably both are of the same material and are of an elastomer material such as "Kalrez" (T.M. of DuPont for perfluoroelastomer resin), with some elasticity and no harder than Durometer 80 and lubricated with a seal grease, such as "Torr-lube" (T.M. of Sputtered Films Inc., California, for high-vacuum grease). The seals are a type of shear seal and should resist wear by the belt. In addition, the seal material should be selected so that it does not "outgas", i.e., produce traces of gases which would contaminate the collected samples of gas.

The distance between the inner edge of the outer groove 38 and the outer edge of the inner groove 37 is greater than the size of the aperture in the belt, when that size is measured in the direction of the belt's movement. For example, if the aperture size is 3/16-inch (0.1875-inch or 0.476 cm) diameter, then the distance between the two seals is greater than 3/16-inch; for example, it may be 0.3 inch (0.762 cm).

Figure 5:
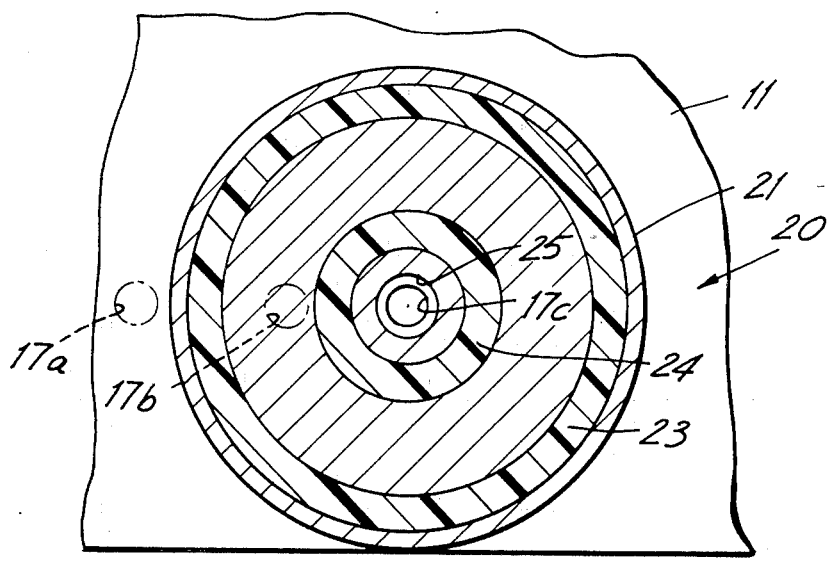
FIG. 5 is a top plan view illustrating the stages of an aperture moving through the concentric seals.

As shown in FIG. 5, the aperture 17 in its position 17a, is first outside the valve block 20. The valve is closed. The belt is advanced and its aperture 17 is moved to its position 17b between the seals. The valve 20 is still closed. The belt is again advanced and the aperture 17 is moved to its position 17c in alignment (concentricity) with the bores of the pair of valve blocks. Such alignment opens the valve and permits a free flow of fluid. The valve is closed by again advancing the belt until the aperture is beyond the inner and outer seals. As an alternative (not shown) three concentric seals may be employed instead of the two seals shown in the figures. Such a three-seal construction will provide a more reliable sealing structure. However, the valve block would have to be considerably enlarged, as the distance between the second and third seals should be greater than the size of the belt aperture.

Figure 6:
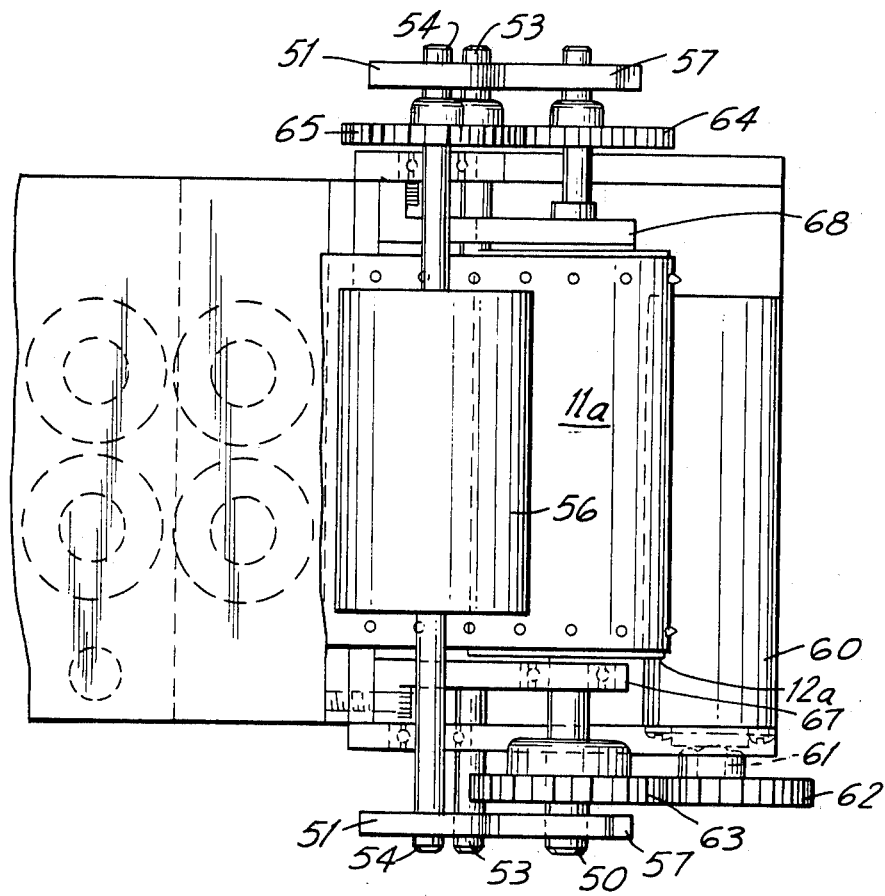
FIG. 6 is a top plan view showing an alternative multi-port apparatus.
Figure 7:
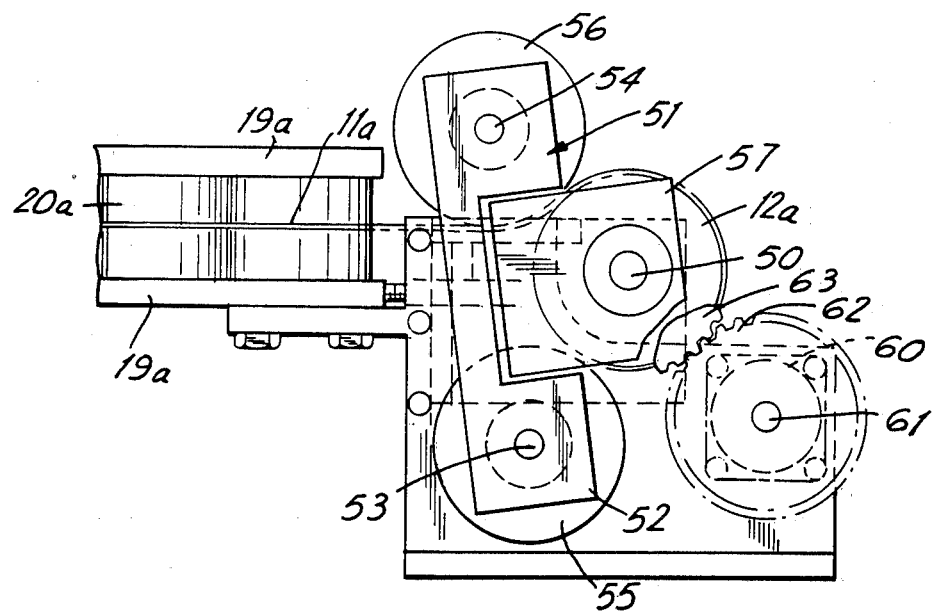
FIG. 7 is a side view of the alternative embodiment of FIG. 6.

In the embodiment of FIGS. 6 and 7, the roller 12a is mounted on shaft 50 which is supported by bearings in brackets 67,68 which are mounted on base 19a. As in the prior embodiments, the pairs of valve blocks 20a are mounted on base 19a so that the seals on their faces are in contact with the belt 11a. The yoke 51 consists of vertically aligned members 52 which rotatably support shafts 53,54 fixed to rollers 55,56. The yoke 51 is spring-urged to yoke blocks 57 which are bearing mounted on shaft 50. This can be accomplished by means well-known in the art, such as the spring urged drive roller 64 shown in U.S. Pat. No. 3,602,096 entitled "Program Control Apparatus". Thereby, yoke 51 urges rollers 55,56 to tension the belt and add frictional contact surface to the surface provided by roller 12a to enhance belt drive capability. In this embodiment, the belt 11a is driven by rollers 12a, 55,56, as described below.

As shown in FIG. 6, the motor 60 has an output shaft 61 to which output gear 62 is fixed. The output gear is in mesh with, and drives, gear 63 fixed to the shaft 50. A gear 64, fixed at the opposite end of the shaft 50, is in mesh with, and drives, gear 65, which is fixed to shaft 54 of roller 56, and the gear 66 (not shown) fixed to the roller 55.

Figure 8:
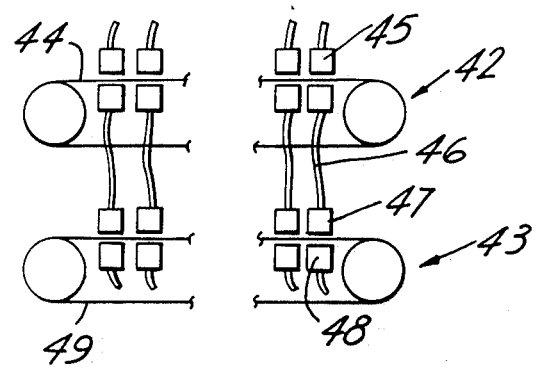
FIG. 8 is a diagram illustrating two multi-port valve assemblies.

As shown in FIG. 8, the multi-port valve apparatus of the present invention may be operated in any desired sequence by using two of the multi-port valve apparatuses 42,43. In this arrangement a fluid path is formed only when two valves in series are opened simultaneously. The first valve is part of the apparatus 42 and the second valve, in series with it, is part of the apparatus 43. For example, the belt 44 is advanced until its aperture is within the valve block pair 45. The valve block pair 45 is connected by hose 46 to the top valve block 47 of the valve block pair 48. To open the series of valves 45,48 the belt 44 is advanced until its aperture is within the valve block pair 45. The control of the belts 44,49 is separate, so that the belts 44 and 49 may be separately advanced. By selecting the timing of the advancement of the belts 44,49, the valve series may be operated in any desired sequence.

The embodiments of the invention in which an exclusive property or privilege is claimed are defined as follows:

1. A multi-port valve apparatus comprising:
   a base, a plurality of pairs of valve block means, each valve block means being adapted to conduct fluid through a bore therewithin, each valve block means having an orifice at the face of its bore, and having first and second seals surrounding its orifice;
   each pair of valve block means being mounted on said base within the valve block means of each pair aligned so that their orifices are aligned, the valve block means face each other and they are positioned with a gap therebetween;
   web means positioned in said gap and slidable therein, said web means being in sealing contact with said first and second seals of each pair of valve block means, said web means having at least one aperture therethrough;
   each of said first and second seals respectively comprising an "O" ring positioned in a groove in the face of said valve block means, sealingly engaged therewith, and a washer seal also positioned in said groove, sealingly engaged with said "O" ring and with said web, said "O" ring and said washer seal being elastomeric, and compression of said "O" ring urges said washer seal against said web;
   said first and second seals being positioned such that the distance between them is at least as great as the size of said web aperture, said size being measured in the direction coincident with the direction of motion of said aperture;
   motor means to move said web means in order to progress its aperture from alignment with the orifices of one pairs of valve block means and into alignment with the orifices of a different pair of valve block means.

2. A multi-port valve apparatus as in claim 1 and further including adjustment means to adjust the force of each of the valve block means on the web means.

3. A multi-port valve apparatus as in claim 1 wherein said first and second seals are each circular seals, viewed looking into said orifice and are each concentric with said orifice.

4. A multi-port valve apparatus as in claim 1 wherein said web means is an endless belt.

5. A multi-port valve apparatus as in claim 4 wherein said belt includes a series of sprocket holes along said belt and the driver roller includes a series of sprocket teeth to drive said belt.

6. A multi-port valve apparatus as in claim 5 and further including two additional rollers driven by said motor which are in spring-loaded contact with said belt to help drive said belt.

7. A multi-port valve apparatus as in claim 4, wherein said motor means comprises a motor having an output shaft, a first gear fixed on said output shaft, a driven roller in contact with said belt to drive said belt, said driven roller being rotatably mounted on said base and having a roller shaft and a second gear fixed on said roller shaft and driven by said first gear, and an idler roller rotatably mounted on said base and in contact with said belt.

8. A multi-port valve apparatus as in claim 1 wherein said web means aperture and said valve block means orifices are round holes and wherein the diameter of said web means aperture is less than or equal to the diameter of said valve block means orifice.

* * * * *